Figure 1:
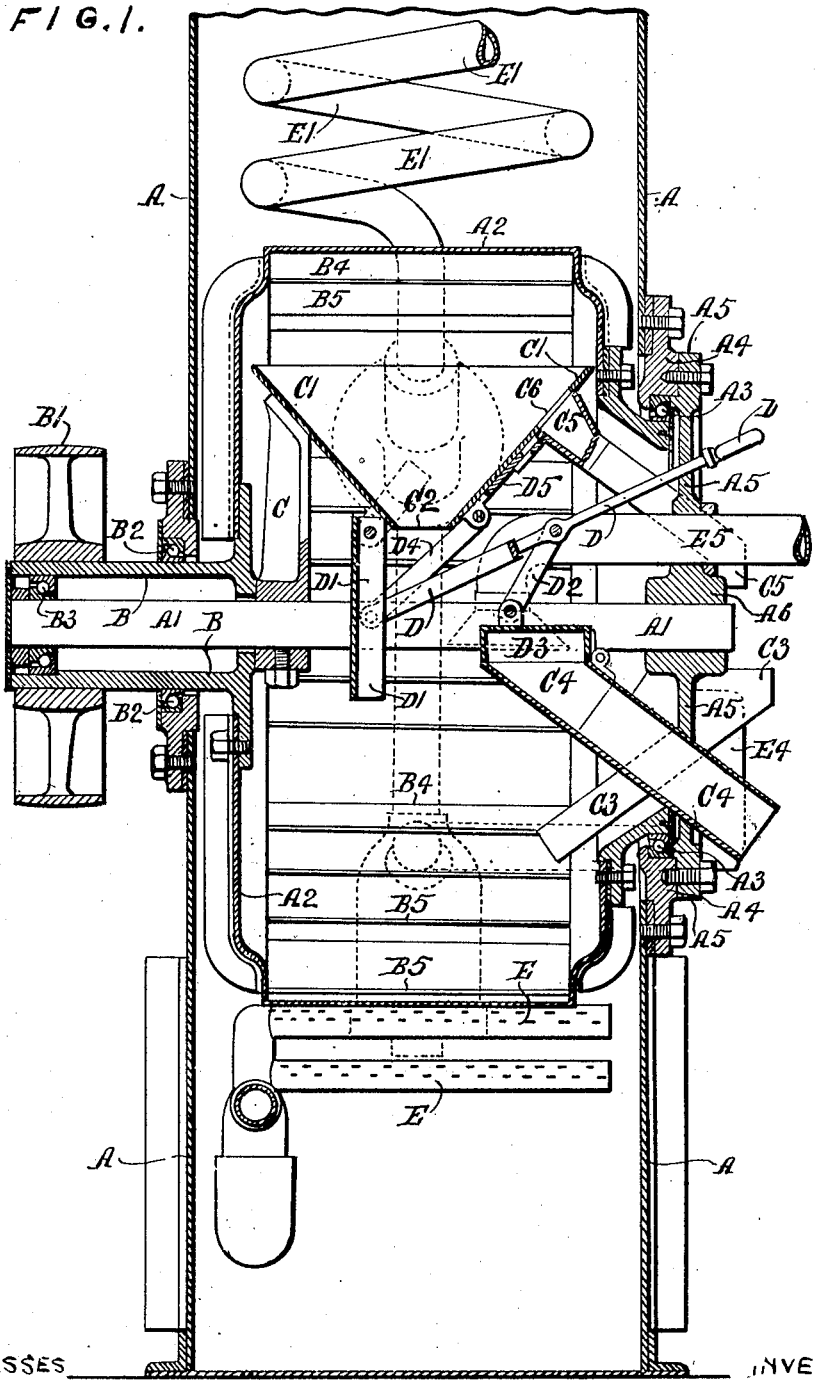

S. CRANSTON.
MACHINE FOR ROASTING COFFEE AND FOR OTHER PURPOSES.
APPLICATION FILED OCT. 26, 1908.

918,423.

Patented Apr. 13, 1909.
4 SHEETS—SHEET 1.

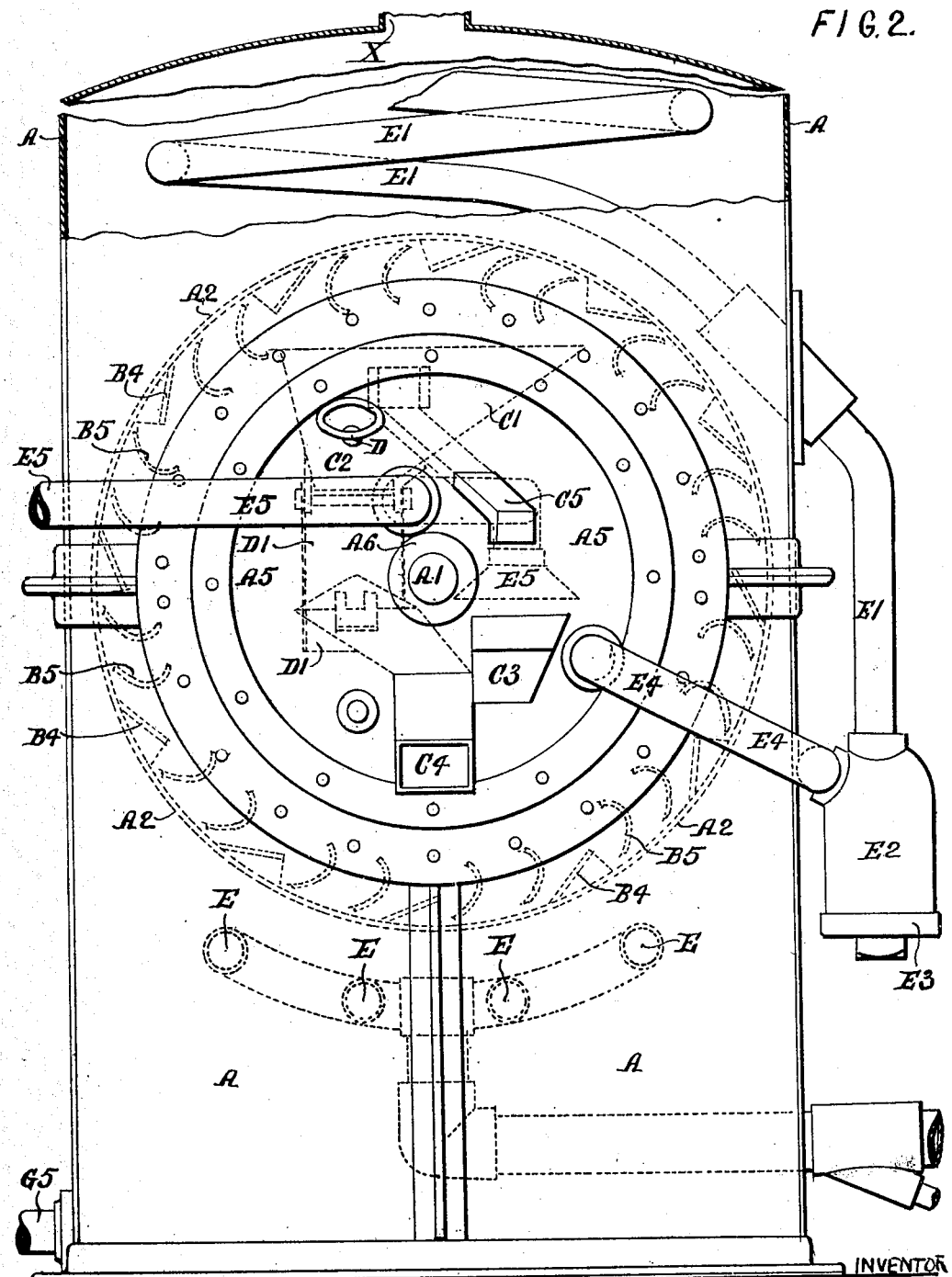

S. CRANSTON.
MACHINE FOR ROASTING COFFEE AND FOR OTHER PURPOSES.
APPLICATION FILED OCT. 26, 1908.
918,423.
Patented Apr. 13, 1909.
4 SHEETS—SHEET 3.
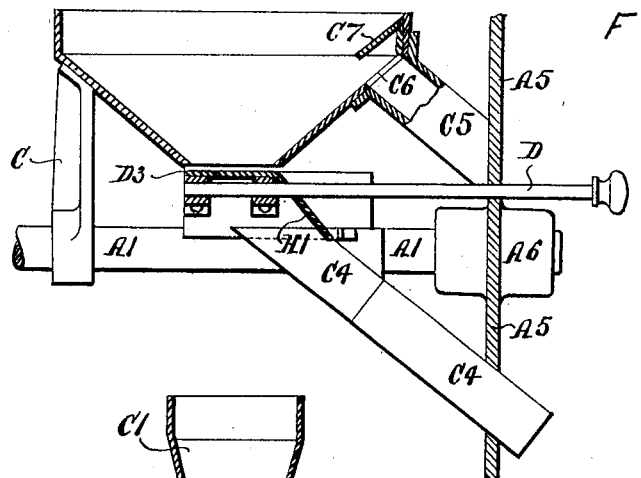
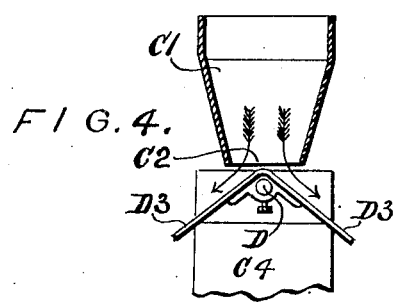
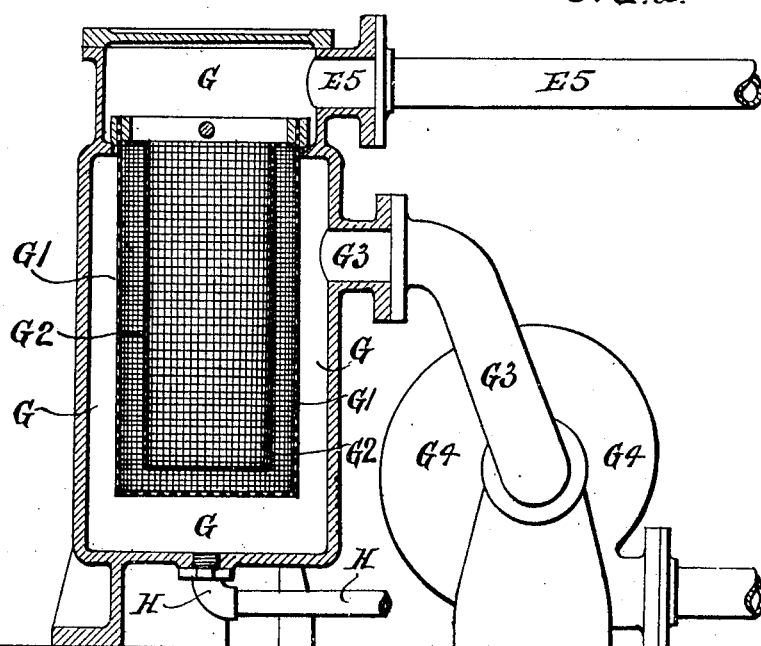
WITNESSES
INVENTOR
Stuart Cranston
BY
Howson and Howson
ATTORNEYS

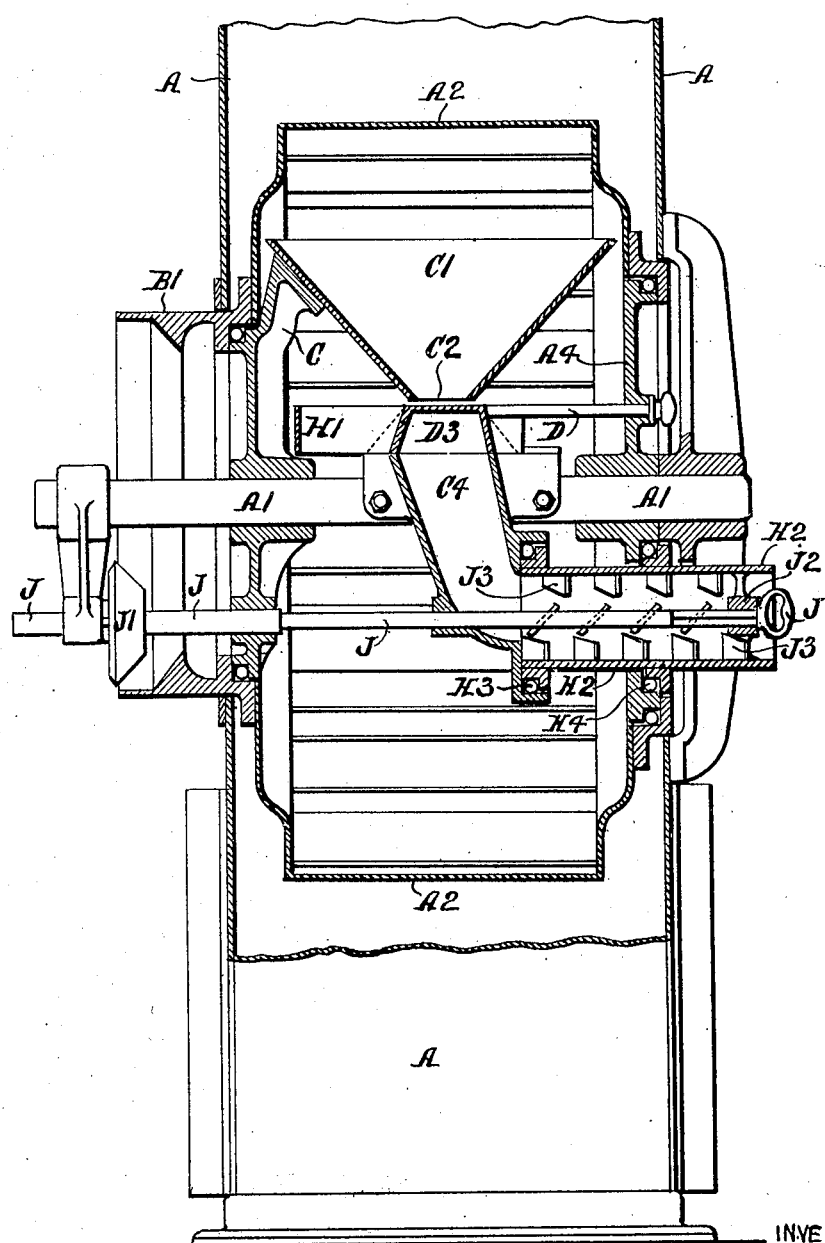

UNITED STATES PATENT OFFICE.

STUART CRANSTON, OF GLASGOW, SCOTLAND.

MACHINE FOR ROASTING COFFEE AND FOR OTHER PURPOSES.

No. 918,423.      Specification of Letters Patent.      Patented April 13, 1909.

Application filed October 26, 1908. Serial No. 459,496.

*To all whom it may concern:*

Be it known that I, STUART CRANSTON, a subject of the King of Great Britain and Ireland, and a resident of Glasgow, Scotland, have invented certain new and useful Improvements in Machines for Roasting Coffee and other Purposes, of which the following is the specification.

This invention has for its object to provide an improved construction of machine by means of which coffee beans or other materials may be roasted and afterward cooled, if desired, in a satisfactory and expeditious manner, the machine being also applicable for cooling the coffee beans after roasting in another machine, and as a tea mixer.

In order that the invention and the manner of performing the same may be properly understood there are hereunto appended four sheets of drawings throughout which like symbols indicate like parts and in which—

Figure 1, Sheet 1, is a transverse vertical section and Fig. 2, Sheet 2, a part front elevation partly in section of one example of the improved machine, the remaining part of the sectional front elevation being shown in Fig. 2ª Sheet 3. Figs. 3 and 4 Sheet 3 being vertical sections at right angles to each other of parts sufficient to show a second example, while Fig. 5 Sheet 4 is a transverse vertical section showing a third example.

In carrying out the invention according to the example shown in Figs. 1, 2 and 2ª the machine comprises a casing A having an overhead canopy from the top of which a flue $x$ leads. Through the casing A there extends a stationary shaft $A^1$ around which a drum $A^2$ is made to revolve, as hereinafter described, within the casing. In the front side of the drum $A^2$, there is an opening, the drum having secured to it at this part an angled ring $A^3$, carrying one race of a ball-bearing, the other race of which is formed in a ring $A^4$, secured to the casing around an opening therein, which opening is closed by a plate $A^5$ secured to the ring $A^4$, the plate having at its center a bearing $A^6$ for one end of the shaft $A^1$. At the opposite side the drum $A^2$ has secured to it a short hollow shaft B concentric with the stationary shaft $A^1$, and projecting out through an opening in that side of the casing A. The drum $A^2$ may be driven in any suitable manner through the hollow shaft B as for instance by mounting on the latter a pulley $B^1$ adapted to be belt driven from any suitable source of power. The hollow shaft B is carried by a ball bearing $B^2$ in the edge of an opening in the casing, and between it and the fixed shaft $A^1$ additional ball bearings $B^3$ are also provided. Within the drum $A^2$, and secured to the sides in any desired manner, near to the internal circumference, there are a number of plates and scoops $B^4 B^5$. These plates and scoops extend from side to side of the drum, the sides of the drum at this point being deflected inwardly in the example shown, so that when in action, as hereinafter described, the material lifted is directed sidewise toward the center and must fall into a hopper $C^1$.

On the fixed shaft $A^1$ there is secured a bracket C extending up within the drum $A^2$ and supporting at its upper end one side of the hopper $C^1$, the upper mouth of which is about the width of the drum. The lower neck $C^2$ of this hopper is slightly above and to one side of the axis of the drum. A feed chute $C^3$ is arranged to deliver material to be treated beneath the axis of the drum. There is also a discharge chute $C^4$, the upper end of which is within the drum $A^2$ and its lower end projects through the closing plate $A^5$. It is put in communication with the lower open end of the hopper $C^1$, as hereinafter described, when the charge is to be withdrawn. An additional sight chute $C^5$ leads from an opening $C^6$ near the upper edge of the hopper. The outer end of this sight chute $C^5$ projects through the plate $A^5$ on the front of the casing A so that it is over the outer open end of the feed chute $C^3$. The upper end of the additional sight chute $C^5$ serves also as a support for the hopper $C^1$. A handled rod D projects through the plate $A^5$ on the front of the casing A and is attached to a chute $D^1$ hinged to the lower edge of the hopper $C^1$, the rod D also having secured to it links, one $D^2$ of which is attached to a door $D^3$ hinged on the upper inner end of the discharge chute $C^4$, and the other $D^4$ being attached to a slide $D^5$ capable of closing the upper end of the additional sight chute $C^5$.

Heat is applied to the exterior of the drum $A^2$ in any desired manner, for example, by a Bunsen burner consisting of a number of perforated pipes E arranged as shown in the lower part of the casing and beneath the drum $A^2$. The products of combustion pass up around the drum $A^2$, through the space between it and the casing A, so that the drum is heated in an efficient manner. From the top of the drum the gases pass into the upper part of the casing, in which part there is arranged a container a coil of piping E¹ through which air is forced. The air thus takes up a large portion of the heat left in the gases after they have acted on the drum. The air heating coil of piping E¹ may be arranged in other desired manner, and additional means of heating the air coil may be used if desired. The end of this air heating coil E¹, passes through the side of the casing A and is connected with the upper end of a trap E² (Fig. 2) the lower end of which is closed by a removable plug E³, the trap catching any impurities deposited in the coil and carried down by the air and by vibration to the trap. From the trap a pipe E⁴ passes through the front plate A⁵ of the main casing A, so that the hot air is discharged within the drum A² to assist in heating the contents thereof. A pipe E⁵ having an inverted flared end within the drum is led outside the casing A to a box G (Fig. 2ᵃ) fitted with a removable screen preferably in the form of two wire gauze cylinders G¹ G², one within the other, the outer one being of finer mesh than the inner one. The box has a pipe G³ leading from the space outside the cylinders into the inlet of a fan G⁴, the discharge pipe G⁵ from which preferably, as shown, passes through the casing A, so that the heat in the air withdrawn from the drum A² may be utilized in externally heating the drum and coil E¹.

In operation, after a charge of the coffee beans to be roasted is fed into the drum A² through the charging chute C³, rotation is imparted to the drum, the external heat applied thereto and the hot air admitted therein, all as hereinbefore described. The drum is rotating clockwise when looking on the front of the casing Fig. 2, and the plates and elevator scoops B⁴ B⁵ dip into the beans which are nearest the lower right hand side, and when the highest point in their rotation is reached they are inverted and discharge their contents into the hopper C¹. From the lower end C² of the hopper, the beans fall in a stream through the hot air in the drum which assists the external heat in effecting the desired roasting of the beans, this hot air aeration considerably expediting the process and preventing the berries taking on what is known as the "bulk-roast flavor." The fan G⁴ drawing from the box G, to which the pipe E⁵ with the flared end is attached, draws off first the dust and any loose fluff or "flights", then the moisture driven off from the beans in the form of vapor or steam; and finally any dry fluff which has become detached from the berries. The fluff is caught by the screen G¹ G², any particles which may be fine enough to pass through the inner screen being caught by the outer one. The double screen is removed and cleaned from time to time, and the moisture which may condense in the box may be drawn off therefrom by a pipe H fitted with a tap, not shown.

As the air supplied to the drum is heated, it expands on reaching the drum so that there is always a plenum of hot air within the drum which prevents the possibility of cold air passing into the drum.

During the rotation of the drum A², a small stream of beans passes from the hopper C¹ through the sight chute C⁵, and a sample can readily be taken as the beans fall from the end of that chute into the mouth of the chute C³ which returns them again to the drum.

When roasting is completed both the external heat and the hot air supply is shut off; and cooling may be effected by continuing the rotation of the drum and drawing cold air through the drum. Or preferably the roasted beans may be discharged into a separate similar machine in which they are cooled. In any case when the discharge is to take place either after roasting or cooling, the handled rod D is pulled outward, this brings the hinged chute D¹ into such a position that it forms an inclined plane between the bottom C² of the hopper C¹ and the inner end of the discharge chute C⁴. The same movement of the handled rod lifts the door D³ which has closed the discharge chute during the roasting operation, and the beans on leaving the hopper pass down the inclined chute D¹ into the discharge chute. At the same time, the slide D⁵ is moved to close the additional sight chute C⁵. The plates B⁴ are so placed relative to the scoops B⁵ that when there are only a few beans left in the drum the plates direct them into the scoops and thus insure that the drum is rapidly and entirely emptied.

Instead of the door D³, covering the inner end of the discharge chute C⁴, being hinged, it may, as shown in Figs. 3 and 4, be arranged to slide, and it has attached to it a small chute H¹ so shaped that on movement of a handled rod D the door D³ is removed from the position in which it covers the discharge C⁴, and the small chute H¹ is interposed to direct the beans from the hopper outlet C² into the discharge. The rate at which the berries escape by the discharge prevents them rising in the hopper to such a height that they could then escape by the sight chute, a shield C⁷ preventing the berries which are raised by the scoops falling through the sight chute when discharge is taking place.

Instead of the berries leaving the drum by gravity through the incline discharge chute C⁴, they may be removed by a helical conveyer arranged horizontally as shown in Fig. 5. This conveyer consists of a drum H², the inner end of which is opposite the lower open end of a discharge chute C⁴, the upper end of which is beneath the discharge C² from the hopper C¹, and is covered and uncovered by a sliding door D³ as in Figs. 3 and 4, but in this case the small discharge chute H¹ is to the rear of the door instead of at the front thereof, so that the handled rod D requires to be moved in the opposite direction to that in Figs. 3 and 4 to effect the covering and uncovering of the discharge C⁴. The drum H² runs on ball bearings H³ H⁴, and a rod J extends through its center and through the back of the casing A. When the rod J which has a swivel joint handle is pulled outward, this puts a small pulley J¹ on the back end of the rod in frictional contact with the inner surface of the driving pulley B¹ so that the small pulley J¹ and the rod J is made to revolve; and, as the front end of the rod is squared and passes through an aperture in a spider J² within the drum H², the drum also then revolves on its bearings. All the berries which fall into the inner end of the drum H² from the discharge C⁴ are then moved gradually through the drum and discharged at its outer end by the conveyer blades J³ secured helically within the drum H².

The machine with feed and discharge chutes, but without the means of heating, or the air supplying and withdrawing mechanism, may be used as a tea mixer.

What I claim is:—

1. In a machine of the type described, an outer casing, a horizontal shaft extending across this casing, a drum rotating on the shaft, lifting devices on the internal circumference of the drum, a hopper so carried within the drum as to receive the material raised by the lifting devices, a discharge chute and means to uncover the inner end of this chute and put the bottom of the hopper in communication therewith when desired, as described.

2. In a machine of the type described, an outer casing, a horizontal shaft extending across this casing, a drum rotating on the shaft, lifting devices on the internal circumference of the drum, a hopper so carried within the drum as to receive the material raised by the lifting devices, a discharge chute, means to uncover the inner end of this chute and put the bottom of the hopper in communication therewith when desired, a sight chute extending from an opening in the hopper through the casing, and means for closing this chute when the discharge chute is uncovered, as described.

3. In a machine of the type described, an outer casing, a horizontal shaft extending across this casing, a drum rotating on the shaft, lifting devices on the internal circumference of the drum, a hopper so carried within the drum as to receive the material raised by the lifting devices, a discharge chute, means to uncover the inner end of this chute and put the bottom of the hopper in communication therewith when desired, means for heating the drum, for supplying heated gaseous fluid to the interior thereof, and for withdrawing therefrom products given off from the material being treated, as described.

4. In a machine of the type described, an outer casing, a horizontal shaft extending across this casing, a drum rotating on the shaft, lifting devices on the internal circumference of the drum, a hopper so carried within the drum as to receive the material raised by the lifting devices, a discharge chute, means to uncover the inner end of this chute and put the bottom of the hopper in communication therewith when desired, a sight chute extending from the opening in the hopper through the casing, and means for closing this chute when the discharge chute is uncovered, means for heating the drum, for supplying heated gaseous fluid to the interior thereof, and for withdrawing therefrom products given off from the material being treated, as described.

5. In a machine of the type described, an outer casing, a horizontal shaft extending across this casing, a drum rotating on the shaft, lifting devices on the internal circumference of the drum, a hopper so carried within the drum as to receive the material raised by the lifting devices, a discharge chute, a helical discharge conveyer extending from the discharge chute through the casing, means to uncover the inner end of the discharge chute and put the bottom of the hopper in communication therewith, and means for rotating the conveyer when discharge of the contents of the drum is to take place, as described.

6. In a machine of the type described, an outer casing, a horizontal shaft extending across this casing, a drum rotating on the shaft, lifting devices on the internal circumference of the drum, a hopper so carried within the drum as to receive the material raised by the lifting devices, a discharge chute, a helical discharge conveyer extending from the discharge chute through the casing, means to uncover the inner end of the discharge chute and put the bottom of the hopper in communication therewith, means for rotating the conveyer when discharge of the contents of the drum is to take place, means for heating the drum, for supplying heated gaseous fluid to the interior thereof, and for withdrawing therefrom products given off from the material being treated, as described.

7. In a machine of the type described, an outer casing, a horizontal shaft extending across this casing, a drum rotating on the shaft, lifting devices on the internal circumference of the drum, a hopper so carried within the drum as to receive the material raised by the lifting devices, a discharge chute, a helical discharge conveyer extending from the discharge chute through the casing, means to uncover the inner end of the discharge chute and put the bottom of the hopper in communication therewith, means for rotating the conveyer when discharge of the contents of the drum is to take place, a sight chute extending from an opening in the hopper through the casing, and means for closing this chute when the discharge chute is uncovered, as described.

8. In a machine of the type described, an outer casing, a horizontal shaft extending across this casing, a drum rotating on the shaft, lifting devices on the internal circumference of the drum, a hopper so carried within the drum as to receive the material raised by the lifting devices, a discharge chute, a helical discharge conveyer extending from the discharge chute through the casing, means to uncover the inner end of the discharge chute and put the bottom of the hopper in communication therewith, means for rotating the conveyer when discharge of the contents of the drum is to take place, a sight chute extending from an opening in the hopper through the casing, means for closing this chute when the discharge chute is uncovered, and means for heating the drum, for supplying heated gaseous fluid to the interior thereof, and for withdrawing therefrom products given off from the material being treated, as described.

In testimony whereof I have signed my name to this specification, in the presence of two subscribing witnesses.

STUART CRANSTON.

Witnesses:
   RICHD. JONES,
   HARVEY J. BAVASTOCK.